US011033007B2

(12) United States Patent
Haney et al.

(10) Patent No.: US 11,033,007 B2
(45) Date of Patent: Jun. 15, 2021

(54) HUMMINGBIRD FEEDER WITH ELASTOMERIC ORNAMENTAL FEED PORT HAVING AN ACCESSORY MOUNTING RIB

(71) Applicant: WOODSTREAM CORPORATION, Lititz, PA (US)

(72) Inventors: Luke Benjamin Haney, Lititz, PA (US); Andrew Gauker, Mohnton, PA (US); Marko Lubic, Shillington, PA (US); Steven Charles Lorraine, Glastonbury, CT (US)

(73) Assignee: Woodstream Corporation, Lancaster, PA (US)

( * ) Notice: Subject to any disclaimer, the term of this patent is extended or adjusted under 35 U.S.C. 154(b) by 258 days.

(21) Appl. No.: 16/380,546

(22) Filed: Apr. 10, 2019

(65) Prior Publication Data

US 2020/0196577 A1 Jun. 25, 2020

Related U.S. Application Data

(60) Provisional application No. 62/783,773, filed on Dec. 21, 2018.

(51) Int. Cl.
*A01K 39/02* (2006.01)
(52) U.S. Cl.
CPC ................ *A01K 39/0206* (2013.01)
(58) Field of Classification Search
CPC ............ A01K 39/0206; A01K 39/0213; A01K 31/12; A01K 39/00; A01K 39/012
See application file for complete search history.

(56) References Cited

U.S. PATENT DOCUMENTS

| | | | | |
|---|---|---|---|---|
| 7,600,487 | B2* | 10/2009 | Stone | A01K 39/02 119/72 |
| 7,685,969 | B2* | 3/2010 | Stone | A01K 39/0206 119/72 |
| 8,763,556 | B1 | 7/2014 | Vaughn, Jr. | |
| 8,869,743 | B2* | 10/2014 | Cruz | A01K 39/0206 119/78 |
| 2007/0272161 | A1* | 11/2007 | Stone | A01K 39/012 119/51.01 |
| 2007/0289540 | A1* | 12/2007 | Stone | A01K 39/0206 119/72 |
| 2011/0297095 | A1* | 12/2011 | Cruz | A01K 39/012 119/80 |
| 2017/0311575 | A1* | 11/2017 | Kong | A01K 45/00 |

* cited by examiner

*Primary Examiner* — Kristen C Hayes
(74) *Attorney, Agent, or Firm* — Barley Snyder (57) ABSTRACT

A hummingbird feeder is provided that includes a nectar container removably coupled to a feeding basin having at least one feed port opening therein and a feed port assembly fitted within the feed port opening. The feed port assembly includes an elastomeric feed port and a feed port accessory. The elastomeric feed port is preferably one molded piece including an ornamentally-shaped head having a diameter greater than the feed port opening and a plug sized to fit snugly within the opening. The outer surface of the plug has at least two ribs longitudinally spaced from one another to enable the feed port to be secured to the basin in at least two different positions including an intermediate position in which the feed port accessory is mounted on the plug and secured between the head and the upper surface of the basin adjacent the feed port opening.

18 Claims, 12 Drawing Sheets

HUMMINGBIRD FEEDER WITH ELASTOMERIC ORNAMENTAL FEED PORT HAVING AN ACCESSORY MOUNTING RIB

This application claims priority from U.S. provisional application Ser. No. 62/783,773, filed Dec. 21, 2018.

BACKGROUND OF THE INVENTION

Field of the Invention

The present invention is related to the field of hummingbird feeders and, more particularly, to a hummingbird feeder that includes an elastomeric ornamentally-shaped feed port having a plug with a mounting rib for securing a perch or other feed port accessory to the feeder.

Description of the Related Art

Hummingbird feeders include a nectar basin having feed ports through which hummingbirds access nectar held in the basin. The feed ports may simply be small openings in the cover or upper surface of the basin through which the hummingbird inserts its beak. However, in many hummingbird feeder designs, the openings in the basin cover are larger and are made to receive artificial flower assemblies. Each flower assembly typically includes a flower body made to resemble the petals of a real flower and a center part that attaches the assembly to the basin cover. The center part, or center plug, which is sized to fill the opening in the basin cover, typically has a central opening therein through which the hummingbirds can access nectar. A flower assembly having a center part is disclosed in U.S. Pat. No. 8,763,556 ("the '556 patent") which is co-owned by the assignee of the instant invention. The complete disclosure of the '556 patent is hereby incorporated by reference herein as if set forth in its entirety.

Hummingbird feeders having flower assemblies may also be provided with perches that are typically mounted to the basin of the feeder. In the case of plastic basins, the perches are often integrally molded with the basin or with the feed port flower assembly. Basins made of metal do not readily lend themselves to this type of construction. Further, integral perches are a fixed component of the feeder which may not always be desired. Therefore, it would be beneficial to have a hummingbird feeder that is adaptable for use with or without perches or other accessories.

SUMMARY OF THE INVENTION

In view of the foregoing, the present invention is directed to a hummingbird feeder that includes a feeding basin removably coupled to a nectar container. The feeding basin has a plurality of feed port openings fitted with a respective plurality of elastomeric feed ports, each feed port having a nectar passageway through which hummingbirds access nectar in the feeding basin. The elastomeric feed port includes an ornamentally-shaped head and a plug. The head is positioned outside the nectar basin, and the plug is engaged within the feed port opening to secure the feed port to the basin. The head is preferably flower-shaped but could be any shape provided the diameter of the head is larger than the plug. The enlarged size of the head relative to the plug prevents the head from being pushed through the feed port opening and also creates an upper barrier for capturing a feed port accessory adjacent an upper surface of the feeding basin as will be further described hereinafter.

The head and plug are preferably integrally molded as a single piece with the outer surface of the plug having at least two rings or ribs longitudinally spaced from one another. The ribs are used to secure the feed port within the feed port opening in different positions including at least a fully inserted position in which the ornamentally-shaped head is against or adjacent the upper surface of the basin, and an intermediate position in which the feed port is secured to the basin but the head is spaced away from the upper surface of the basin by a greater distance than when the feed port is in the fully inserted position. The intermediate position allows a perch or other feed port accessory to be mounted on the plug between the head and the basin upper surface.

The present invention is also directed to a feed port assembly for a hummingbird feeder that includes a feeding basin removably coupled to a nectar container and that has a cover with a plurality of feed port openings operative with the feed port assembly. The feed port assembly includes the elastomeric feed port as described in the preceding paragraph and a perch or other feed port accessory mounted on the plug of the feed port. More specifically, the feed port accessory includes a support arm having a mounting end to secure the accessory to the plug, the mounting end being captured between the head and a rib on the plug above the basin upper surface or between a rib on the plug and the basin upper surface when the feed port is mounted on the feeding basin in the intermediate position. Preferably, the support arm is provided with a downwardly depending tab having a hooked end that is secured against or under the lower edge of the cover to prevent rotation of the feed port accessory.

Accordingly, it is an object of the present invention to provide a hummingbird feeder that includes a feeding basin with at least one feed port opening fitted with an elastomeric feed port having an ornamentally-shaped head larger than the feed port opening and a plug configured to be received within the feed port opening, the plug having a plurality of rings or ribs longitudinally spaced from one another to enable the feed port to be mounted to the feeding basin in at least two positions.

Another object of the present invention is to provide a hummingbird feeder in accordance with the preceding object in which the plug includes two longitudinally spaced ribs that allow the feed port to be mounted in a fully inserted position in which the ornamentally-shaped head is against or adjacent the upper surface of the basin cover, and an intermediate position in which the head is spaced away at a greater distance from the upper surface of the basin cover while still being secured thereto, the intermediate position allowing a perch or other accessory to be mounted on the plug and captured between the head and a rib on the plug positioned above the upper surface of the feeding basin or between a rib on the plug that is positioned above the upper surface of the feeding basin and the upper surface of the feeding basin.

A further object of the present invention is to provide a hummingbird feeder in accordance with the preceding object in which both ribs are inside the basin in the fully inserted position while in the intermediate position a first distal rib is inside the basin and a second proximal rib is above and adjacent the upper surface of the basin cover.

A still further object of the present invention is to provide a hummingbird feeder in accordance with at least one of the preceding objects in which the ornamentally-shaped elastomeric head is flower-shaped.

Yet a further object of the present invention is to provide a hummingbird feeder in accordance with at least one of the preceding objects in which the ornamentally-shaped head and plug of the elastomeric feed port are integrally molded as a single piece.

Still a further object of the present invention is to provide a hummingbird feeder in accordance with at least one of the preceding objects in which the feed port accessory is a perch mounted on a support arm, the support arm including a downwardly depending tab having an end configured to be secured against or under the lower edge of the basin cover to prevent rotation of the perch.

Another object of the present invention is to provide a hummingbird feeder that includes a feeding basin with at least one feed port opening, and at least one feed port assembly, the feed port assembly including an elastomeric feed port configured to be received within the feed port opening and a feed port accessory, the elastomeric feed port including an ornamentally-shaped head that is larger than the feed port opening and a plug sized to be received in the feed port opening, the plug having an external surface with a plurality of ribs longitudinally spaced from one another to enable the feed port to be mounted to the feeding basin with the plug inserted within the feed port opening in at least a first position without the feed port accessory and a second position in which the feed port accessory is mounted on the plug between the head and the upper surface of the basin cover when the feed port is secured to the feeding basin.

Yet another object of the present invention is to provide a hummingbird feeder and feed port accessory in accordance with the preceding object in which the feed port accessory includes a support arm having a ring-shaped mounting end that is secured around the plug before the feed port plug is inserted within the feed port opening to mount the feed port assembly on the feeding basin in the second position.

Still another object of the present invention is to provide a hummingbird feeder and feed port accessory in accordance with at least one of the preceding two objects in which the feed port accessory includes a perch on the opposite end of the support arm from the mounting end, the support arm including a downwardly depending tab having an end configured to be secured against or under the lower edge of the basin cover to prevent rotation of the perch.

A further object of the present invention is to provide a hummingbird feeder and feed port accessory in accordance with at least one of the preceding three objects in which the ornamentally-shaped elastomeric head is flower-shaped.

A still further object of the present invention is to provide a hummingbird feeder and feed port accessory in accordance with at least one of the preceding four objects in which the ornamentally-shaped head and plug of the elastomeric feed port are integrally molded as a single piece.

Another object of the present invention is to provide a feed port assembly for a hummingbird feeder that has a feeding basin with feed port openings, the feed port assembly including an elastomeric feed port configured to be received within one of the feed port openings, and a feed port accessory, the elastomeric feed port including an ornamentally-shaped head having a diameter greater than that of the feed port opening and a plug that fits within the feed port opening, the plug having a plurality of ribs longitudinally arranged to enable the feed port to be mounted to the feeding basin in at least a first position without the feed port accessory and a second position in which the feed port accessory is mounted on the plug when the feed port is secured to the feeding basin.

Yet another object of the present invention is to provide a feed port assembly for a hummingbird feeder in accordance with the preceding object in which the feed port accessory has a ring-shaped mounting end that is secured on the plug before the feed port is inserted within the feed port opening and mounted on the feeding basin in the second position so that the ring-shaped mounting end is positioned between the head and the basin.

Still another object of the present invention is to provide a feed port assembly for a hummingbird feeder in accordance with at least one of the preceding two objects in which the feed port accessory includes a perch positioned opposite the mounting end on a support arm, the support arm including a tab or flange configured to be secured against or under the lower edge of the basin cover to prevent rotation of the perch.

A further object of the present invention is to provide a feed port assembly for a hummingbird feeder in accordance with at least one of the preceding three objects in which the ornamentally-shaped elastomeric head is flower-shaped.

A still further object of the present invention is to provide a feed port assembly for a hummingbird feeder in accordance with at least one of the preceding four objects in which the ornamentally-shaped head and plug of the elastomeric feed port are integrally molded as a single piece.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

It is to be understood that the embodiments described herein are disclosed by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 1:
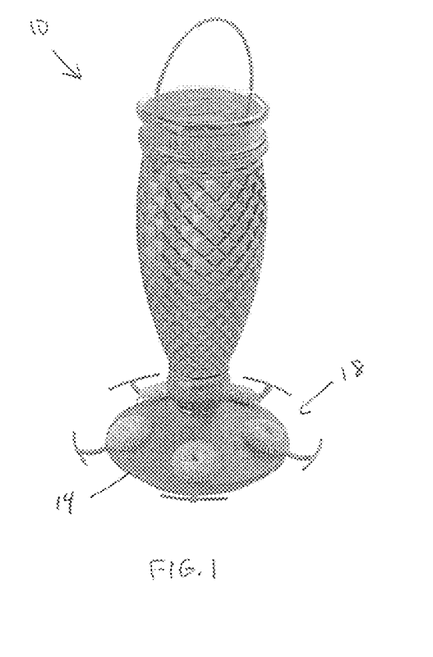
FIG. 1 is a perspective view of a hummingbird feeder having a plurality of feed port assemblies in accordance with a first embodiment of the present invention.
Figure 1A:
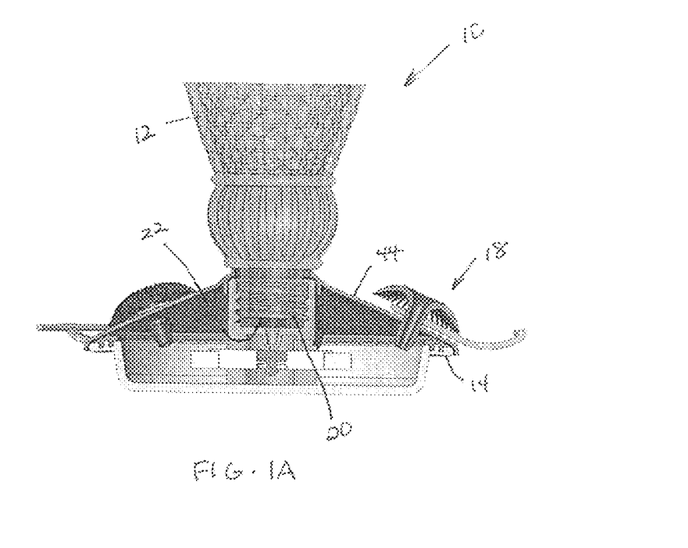
FIG. 1A is a partial cut-away side view of the hummingbird feeder shown in FIG. 1.
Figure 2:
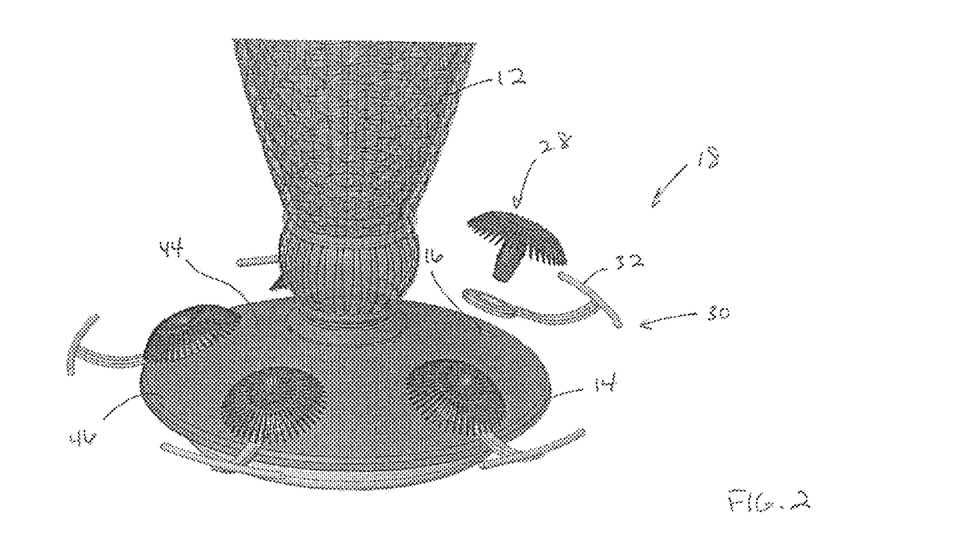
FIG. 2 is an enlarged partial view of the hummingbird feeder shown in FIG. 1 in which one of the feed port assemblies is shown in an exploded view.

As shown in FIGS. 1, 1A and 2, the present invention is directed to a hummingbird feeder generally designated by reference numeral 10. The feeder includes a nectar container 12 and a feeding basin 14 having at least one feed port opening 16 (see FIG. 2) that is fitted with a removable feed port assembly generally designated by reference numeral 18.

As shown in FIG. 1A, the nectar container 12 includes a lower end 20 with a bottom opening 22. The feeding basin 14 is removably coupled the lower end 20 of the nectar container 12 and is in liquid flow communication with the bottom opening 22. Nectar held in the container flows into the feeding basin 14 through the bottom opening 22 and is accessed by hummingbirds through the feed port openings 16 in the basin 14, as fitted with the feed port assemblies 18.

Figure 3:
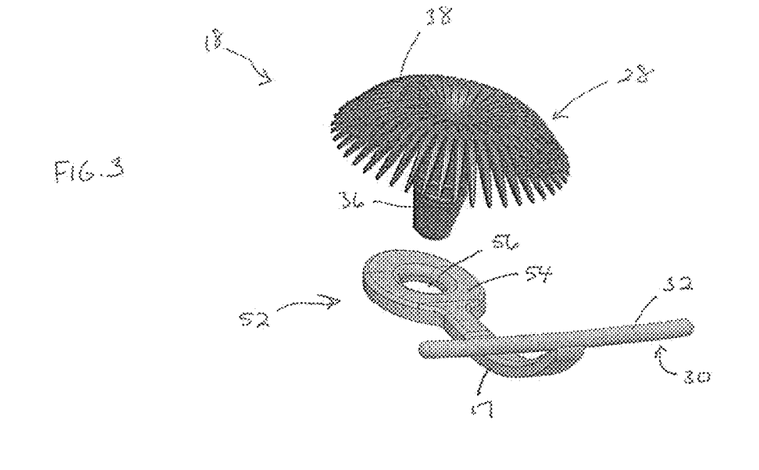
FIG. 3 is an isolated perspective view of the exploded feed port assembly shown in FIG. 2.
Figure 4:
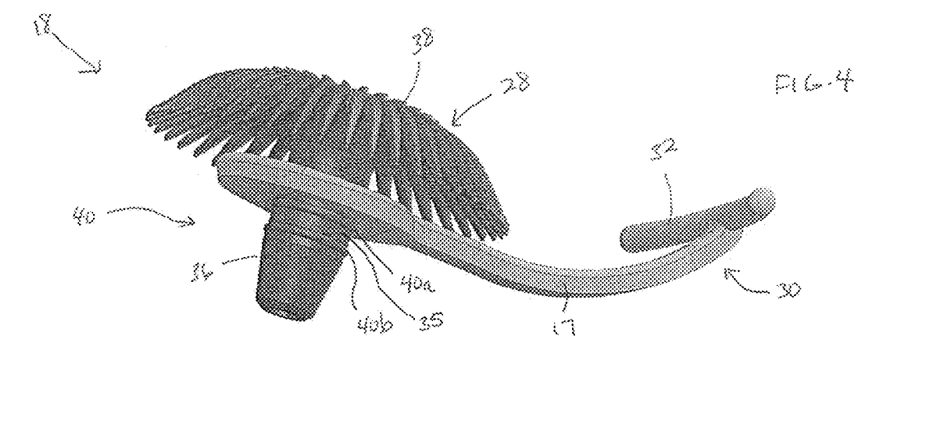
FIG. 4 is an isolated perspective view of the feed port assembly shown in FIG. 3 as assembled.

As shown in isolation in FIGS. 3 and 4, the feed port assembly 18 includes an elastomeric feed port generally designated by reference numeral 28 and a feed port accessory generally designated by reference numeral 30. In the embodiment shown, the feed port accessory 30 includes a perch 32.

The elastomeric feed port 28, which has a nectar passageway 34 (see FIGS. 5, 6 and 7) through which hummingbirds access nectar in the feeding basin 14, includes a plug 36 and an ornamentally-shaped head 38. The plug 36 is engaged within the feed port opening 16 to secure the feed port 28 to the nectar basin 14. The ornamentally-shaped head 38 is positioned outside the basin and, according to the embodiment shown, is shaped like a flower. However, the ornamentally-shaped head could have other shapes so long as the head is larger than the diameter of the feed port opening 16. The enlarged sized of the head ensures that the feed port cannot be pushed all the way through the feed port opening and into the basin and also creates an upper barrier for the mounting end of a feed port accessory. The head 38 and the plug 36 are preferably integrally molded as a single piece.

The outer surface of the plug 36 has at least two rings or ribs, generally designated by reference numeral 40, that are longitudinally spaced from one another as best seen in FIG. 4. The rib 40 nearest the head 38 is referred to herein as the proximal rib 40a and the rib farthest from the head is referred to as the distal rib 40b.

According to a first preferred embodiment shown in FIGS. 1-7, the ribs are spaced about ⅛ inch (3.75 mm) to about 5/16 inches (7.94 mm) from each other and preferably between 1/16 inch (1.58 mm) and 3/16 inches (4.76 mm). As used in connection with the spacing of the ribs, the word "about" is intended to refer to the stated values plus or minus 1/16 inch (1.58 mm). The space between the ribs is referred to herein as the neck 35. The ribs 40 are used to secure the feed port 28 in different positions of depth within the feed port opening 16. These positions include at least a first or fully inserted position and a second or intermediate position.

Figure 7:
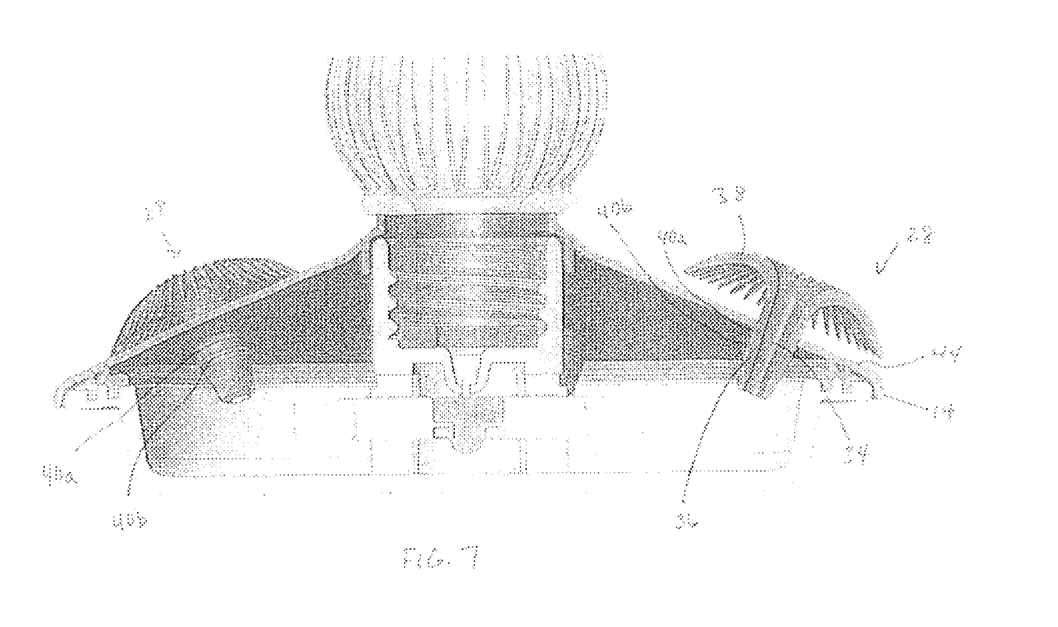
FIG. 7 is a partial cut-away view of a bird feeder having a feeding basin with feed ports mounted within feed port openings in a feeding basin in the fully inserted or first position without a feed port accessory.
Figure 8:
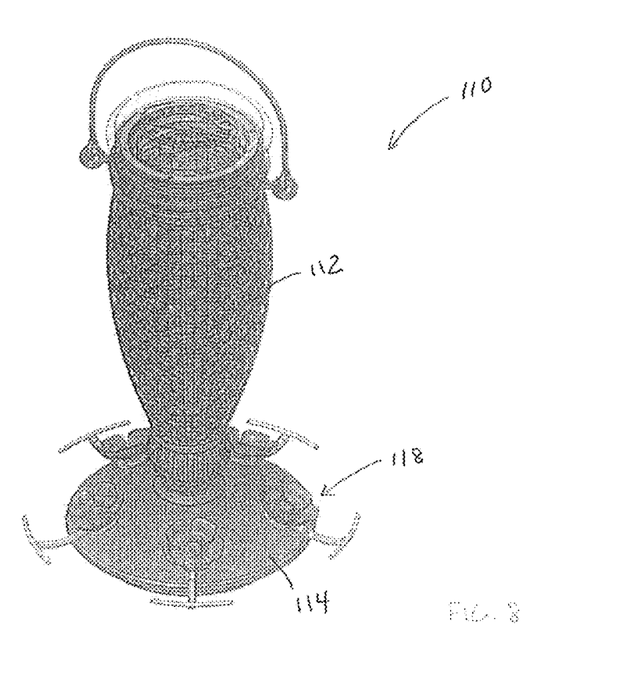
FIG. 8 is a perspective view of a hummingbird feeder having a plurality of feed port assemblies in accordance with a second embodiment of the present invention.

In the first or fully inserted position, both the proximal rib 40a and the distal rib 40b are beneath the lower inner surface 48 of the basin cover 46 as shown in FIG. 7. In the first position, the ornamentally-shaped head 38 is adjacent the upper surface 44 of the cover 46 of the basin 14 and may be kept slightly above the upper surface 44 by an increased plug diameter at the base of the head.

Figure 5:
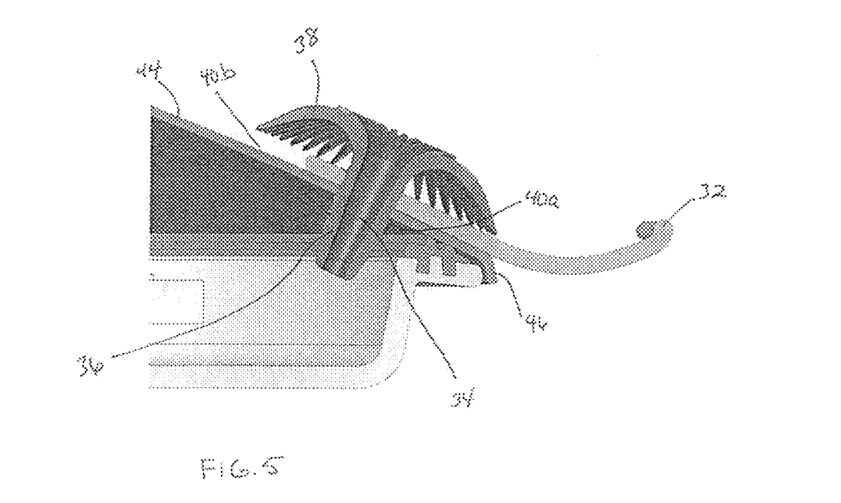
FIG. 5 is a side cutaway view of the assembled feed port assembly shown in FIG. 4 and mounted on the feeding basin in a second or intermediate position.
Figure 6:
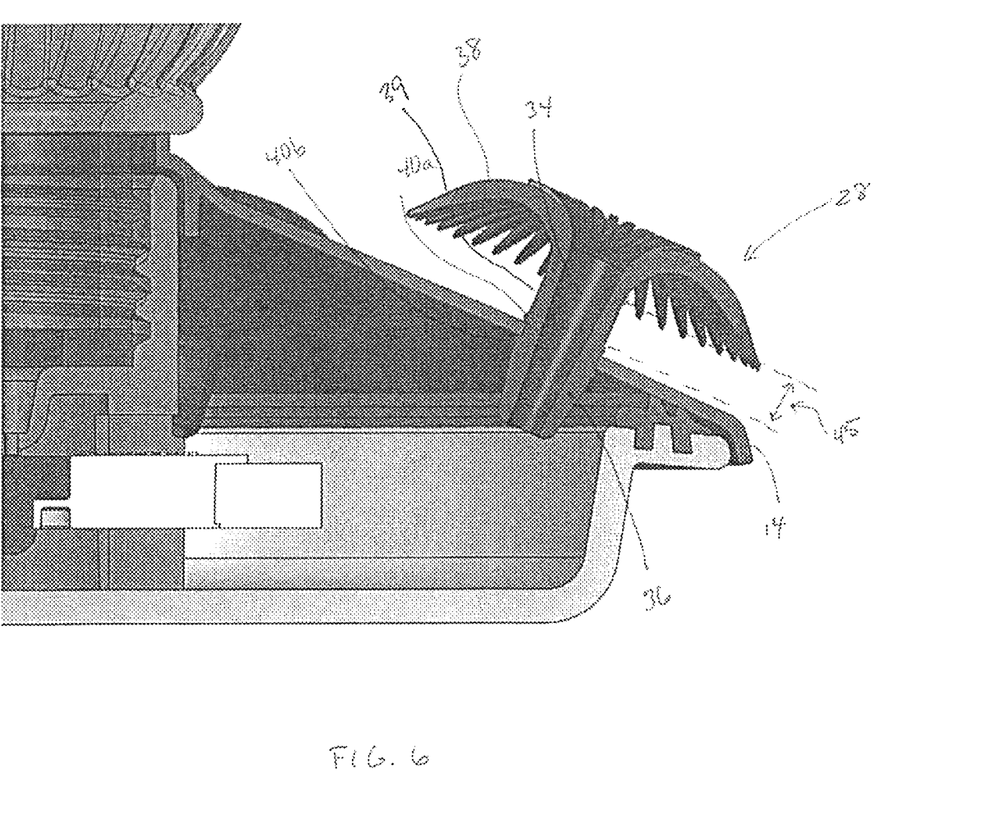
FIG. 6 is an isolated view of the feed port shown in FIG. 5 but without the feed port accessory to more clearly show an accessory mounting interval between the head and at least one rib on the plug that is positioned above the upper surface of the basin cover when the feed port is secured in the second position.

In the second or intermediate position, which is shown in FIGS. 5 and 6, the head 38 is spaced further away from the upper surface 44 of the basin cover 46 than when the feed port is in the first position while still being secured to the basin cover. This spacing, as provided in the intermediate position, creates an accessory mounting interval 45 along the shaft 39 of the plug. This interval 45 provides clearance to mount the feed port accessory 30, shown as a perch 32 in FIG. 5, below the head and above the upper surface 44 of the basin cover 46.

More specifically, according to the first embodiment, the accessory mounting interval 45 is defined as the distance between the head 38 and the proximal rib 40a on the plug when the feed port is secured in the second position, as shown without an accessory for clarity in FIG. 6. Preferably, the accessory mounting interval has a length along the shaft 39 of between about ⅛ inch (3.75 mm) and about 5/16 inches (7.94 mm) and is preferably between 1/16 inch (1.58 mm) and 3/16 inches (4.76 mm). As used in connection with the accessory mounting interval, the word "about" is intended to refer to the stated values plus or minus 1/16 inch (1.58 mm).

As best seen in FIG. 3, the perch 32 is coupled to or integral with a support arm 17 having a mounting end generally designated by reference numeral 52 to secure the perch to the shaft 39 of the plug 36 within the accessory mounting interval 45 between the head 38 and the proximal rib 40a on the plug, which is above the basin cover upper surface 44 when the feed port is mounted on the feeding basin in the intermediate position. In the embodiment shown, the mounting end 52 includes a ring 54 having an inner opening 56 through which the plug shaft 39 extends as shown in FIGS. 4 and 5. The inner diameter of the mounting ring is smaller than the outer diameter of the rib on the plug so that the rib must be forced through the ring, with the ring thereafter being secured on the shaft 39 of the plug 36 with an interference or friction fit. Preferably, the inner diameter of the mounting ring on the perch accessory is the same size as the hole diameter of the feed port opening in the basin.

While a perch 32 with support arm 17 is shown herein, other feed port accessories 30 having a similar mounting end but different free end features are also envisioned such as ornamental leaves, stems, petals and the like. These ornamental features may be configured to surround the feed port opening and/or to project from the feeder like a vine. With each being mounted in the same manner, a plurality of different feed port accessories 30 may be mounted and easily interchanged on the feed port 28 to customize the feeder's appearance and functionality.

When the feed port assembly 18 is secured to the basin 14 as shown in FIG. 5, the plug 36 extends through the opening 56 in the ring 54 of the feed port accessory 30 and is secured within the feed port opening 16 of the basin 14 by the distal rib 40*b*. The ring 54 on the mounting end 52 of the feed port accessory 30 is thus captured on the shaft 39 within the accessory mounting interval 45 between the proximal rib 40*a* and the head 38 of the elastomeric feed port 28, with the outer perimeter of the head 38 being larger than the inner diameter of the ring 54 such that the ring cannot be pulled up and over the head.

In the embodiments shown, the ribs 40 are formed as a flexible ridge around the outer circumference of the plug 36. The outer circumference of the ribs 40 is greater than the neck 35 and the shaft 39, and also greater than the inner diameter of the feeding basin port hole 16 so that, when the plug 36 is inserted into the basin feed port opening and pressed, the ribs 40 flex to pass through the port hole and then snap back out to secure the feed port 28 and assembly 18 within the basin port hole 16 with a snap fit. When the feed port is in the first position, the shaft is in frictional engagement with the feed port hole. When the feed port is in the second position, the neck is in frictional engagement with the feed port hole. The ribs 40 may have various cross-section configurations including semi-circular, triangular, and the like, provided the ribs effectively engage with the edge of the basin feed port openings 16 to secure the feed port 28 to the basin.

A second embodiment of the present invention is shown in FIGS. 8-13A. The features of the second embodiment correspond in function to those already described in connection with the first embodiment and are represented by corresponding reference numerals to which the prefix of a "1" has been added. Therefore, the hummingbird feeder according to the second embodiment is designated by reference numeral 110, the feed port assembly is designated by reference numeral 118, the feed port is designated by reference numeral 128, and so forth. With this understanding, only the aspects of the second embodiment that differ from the first embodiment will be described in detail.

In particular, according to the second embodiment, the proximal rib 140*a* and the distal rib 140*b* are spaced apart by about 3/16 inch to about 1/4 inch, and are preferably 1/8 inch to 3/16 inches apart to define the neck 135. As with the other rib spacing distances, use of the term "about" is intended to refer to the stated values plus or minus 1/16 inch (1.58 mm).

Figure 9:
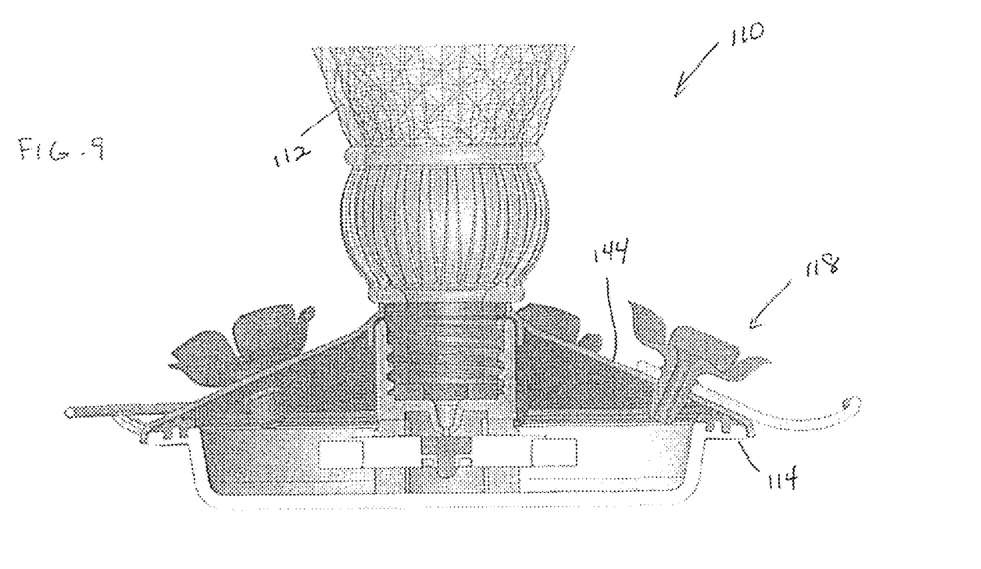
FIG. 9 is a partial cut-away side view of the hummingbird feeder shown in FIG. 8.
Figure 10:
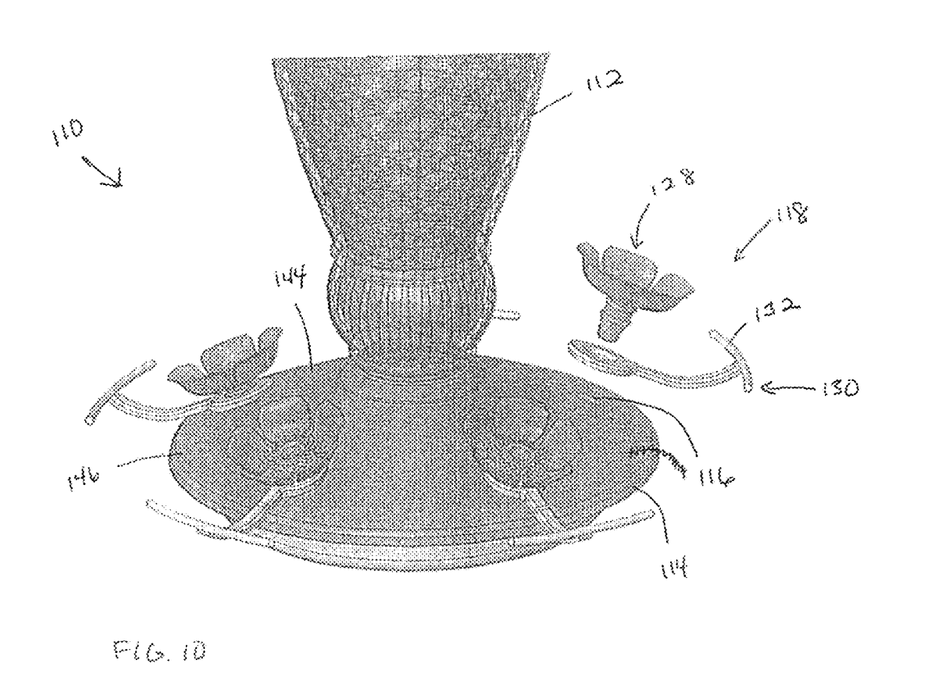
FIG. 10 is an enlarged partial view of the hummingbird feeder shown in FIG. 8 in which one of the feed port assemblies is shown in an exploded view.
Figure 10A:
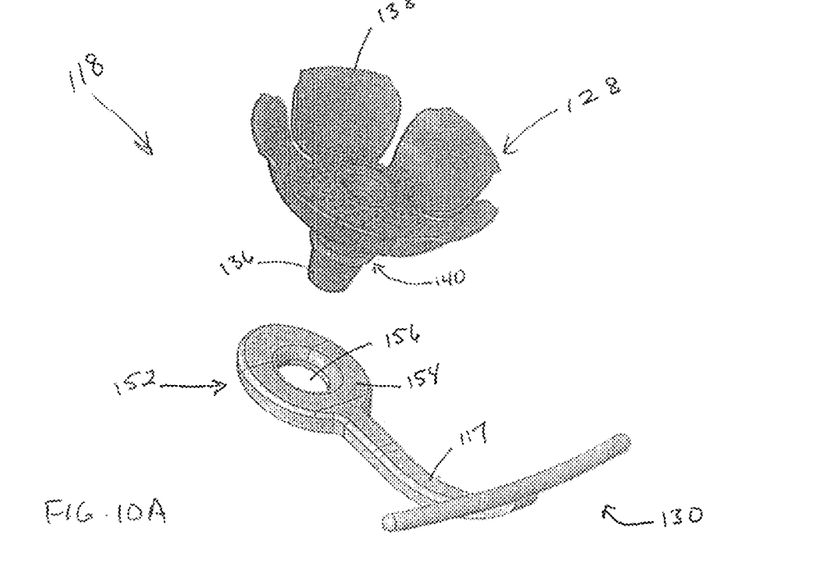
FIG. 10A is an isolated perspective view of the exploded feed port assembly shown in FIG. 10.
Figure 10B:
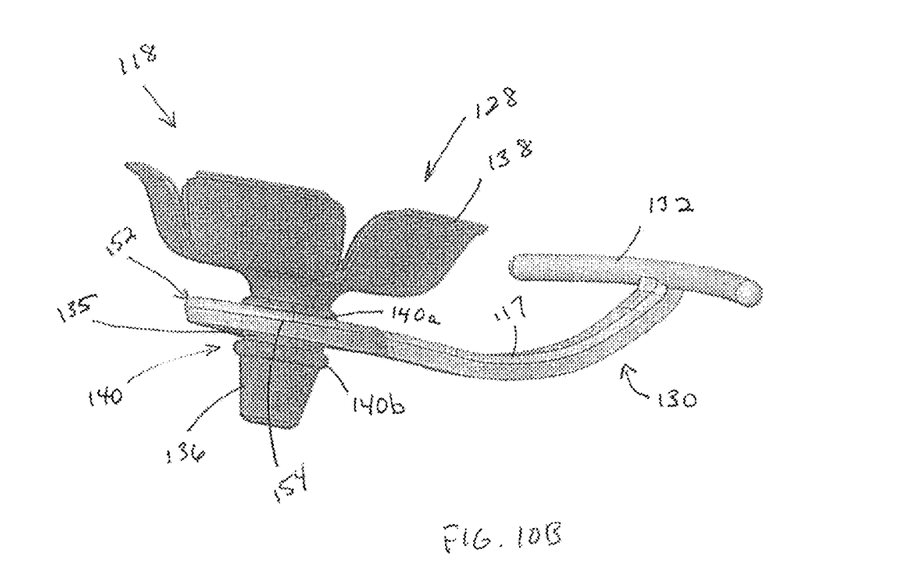
FIG. 10B is an isolated perspective view of the feed port assembly shown in FIG. 10A as assembled.
Figure 12:
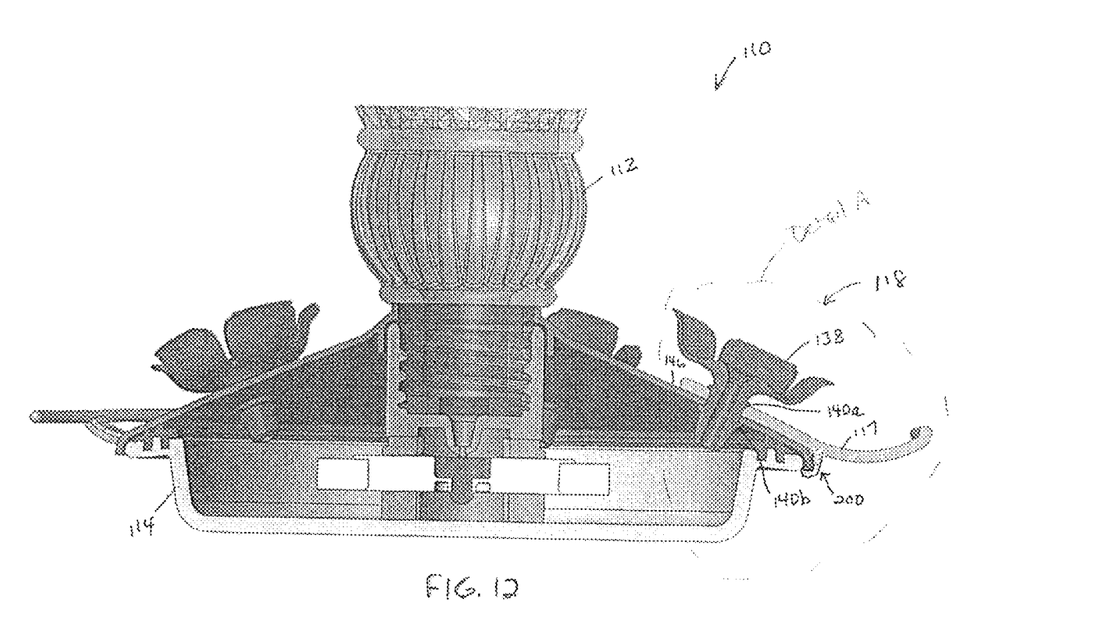
FIG. 12 is a side cutaway view of the assembled feed port assembly shown in FIG. 11 and mounted on the feeding basin in a second or intermediate position.
Figure 12A:
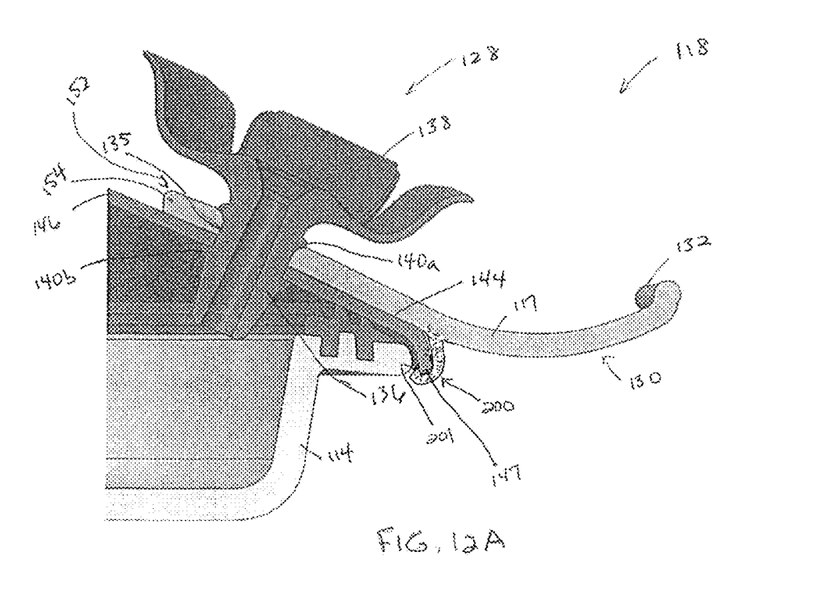
FIG. 12A is an enlarged view of Detail A of FIG. 12.
Figure 13:
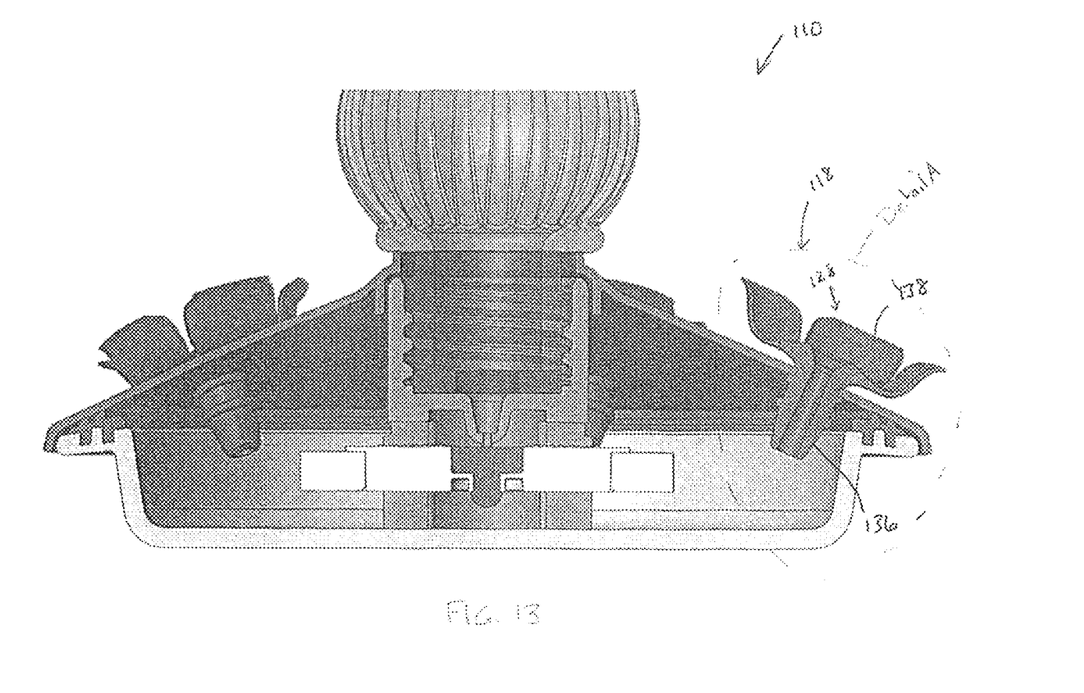
FIG. 13 is a side cut-away view of a feed port like that shown in FIG. 10A as mounted to the feeding basin in the fully inserted or first position without a feed port accessory.
Figure 13A:
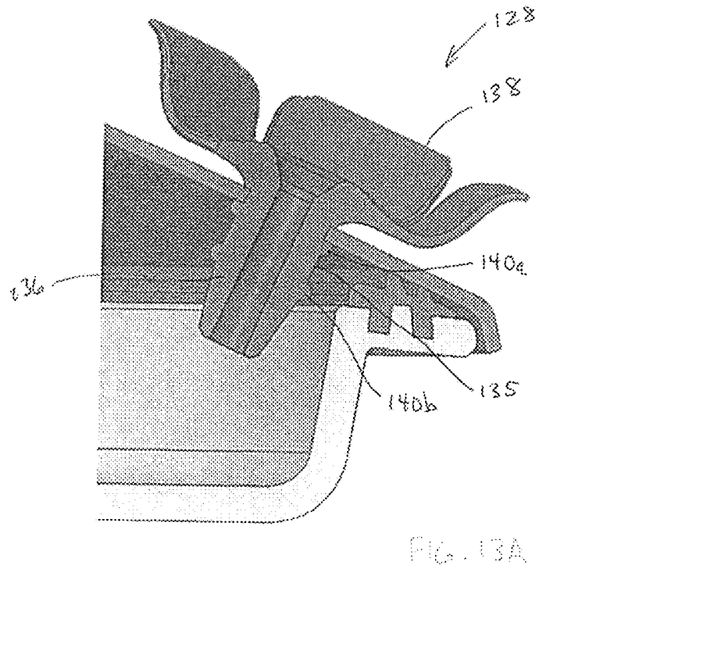
FIG. 13A is an enlarged view of Detail A of FIG. 13.

Accordingly, as shown in FIGS. 9, 12 and 12A, the mounting ring 154 at the mounting end 152 of the feed port accessory 130 is positioned between the proximal rib 140*a* and the distal rib 140*b* so as to be captured on the neck 135 of the plug 136 between the proximal rib 140*a* and the upper surface 144 of the cover 146 of the basin 114 when the accessory 130 is mounted with the feed port 128 in the intermediate position. When the feed port 128 is mounted in the first or fully inserted position shown in FIGS. 13 and 13A, both ribs 140*a*, 140*b* are positioned inside the basin as in the first embodiment.

Figure 11:
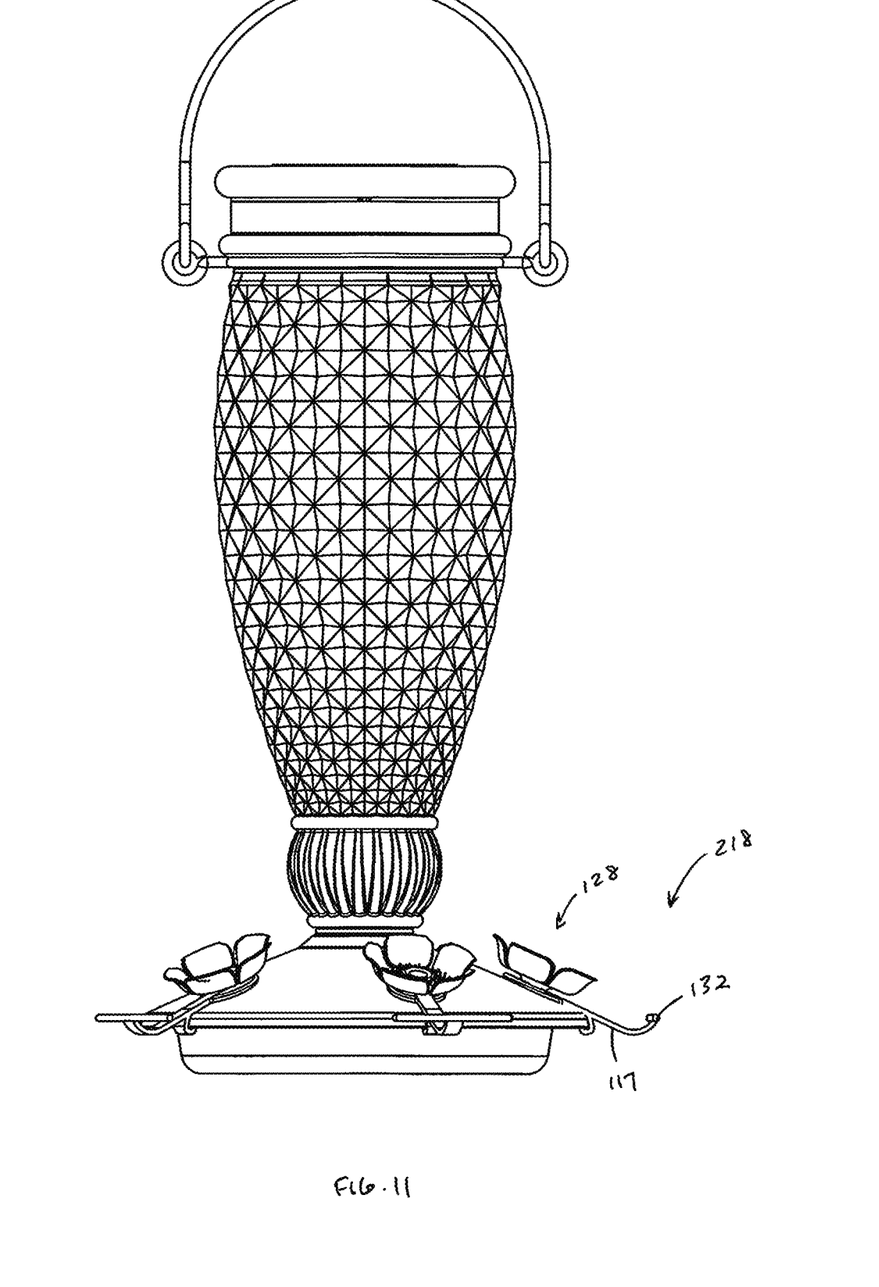
FIG. 11 is a side view of a hummingbird feeder with feed port assemblies like that shown in FIG. 8 but having perches with downwardly depending tabs that are secured to the basin cover to prevent rotation of the perches.
Figure 11A:
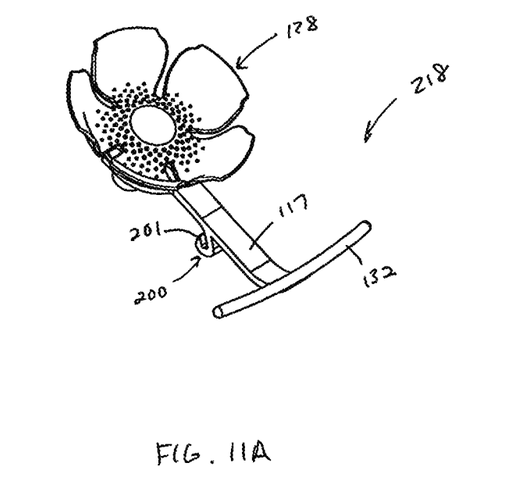
FIG. 11A is an upper perspective isolated view of a feed port assembly including a perch accessory like that shown in FIG. 11.
Figure 11B:
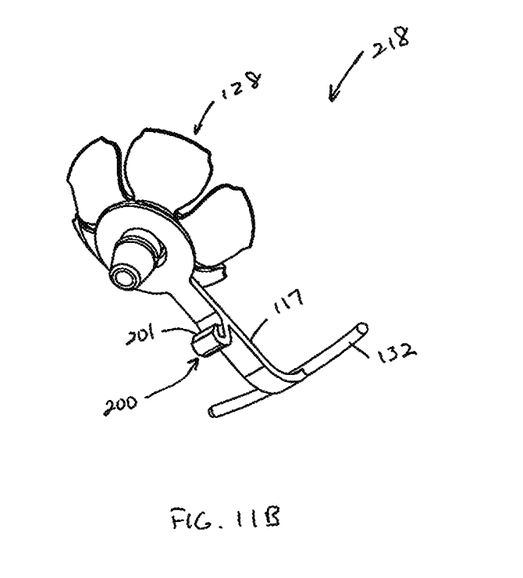
FIG. 11B is a lower perspective view of the feed port assembly and perch shown in FIG. 11A.

In addition to the positioning of the ribs relative to the basin according to the second embodiment, a preferred configuration for the support arm 117 of the perch 132 of the feed port assembly 218 is shown in FIGS. 11-12A. More particularly, the support arm 117 of the perch 132 is preferably configured to include a downwardly depending tab, generally designated by reference numeral 200, with a hooked end 201 that is secured against or under the lower edge 147 of the basin cover 146 as best seen in FIGS. 12 and 12A. The tab 200 with hooked end 201, preferably secured onto the basin cover with a snap fit, a friction fit or the like, secures the perch 132 or other accessory against the basin cover 146 and prevents rotation of the perch when the feed port 128 has been plugged into the port hole. And, while not specifically illustrated herein, it will be understood that the support arm 117 with tab 200 and hooked end 201 configuration may also be incorporated in like manner within the feed port assembly 18 of the first embodiment as well as other embodiments of the present invention disclosed hereinafter.

Figure 14:
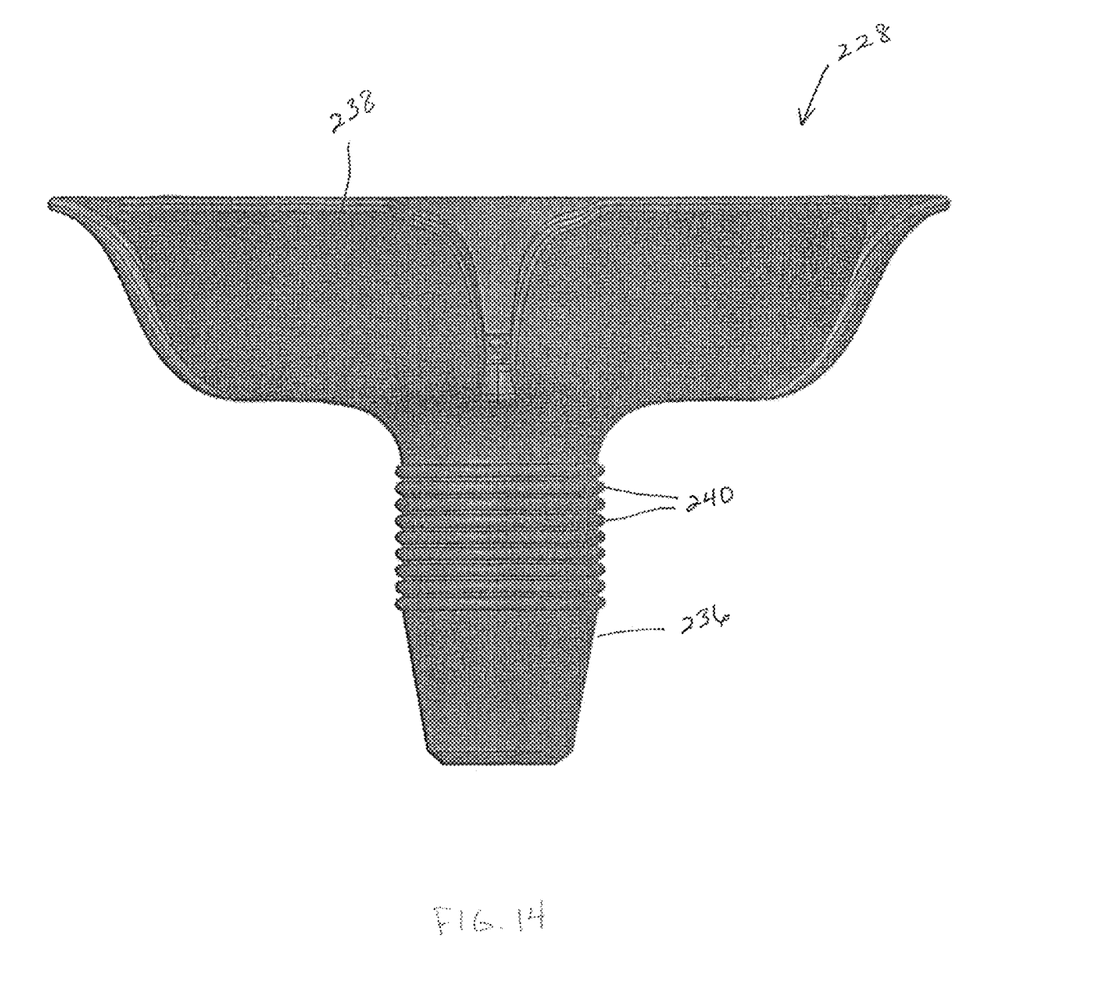
FIG. 14 is a side view of a feed port having a plug with a plurality of ribs in abutment with one another in accordance with a third embodiment of the present invention.
Figure 15:
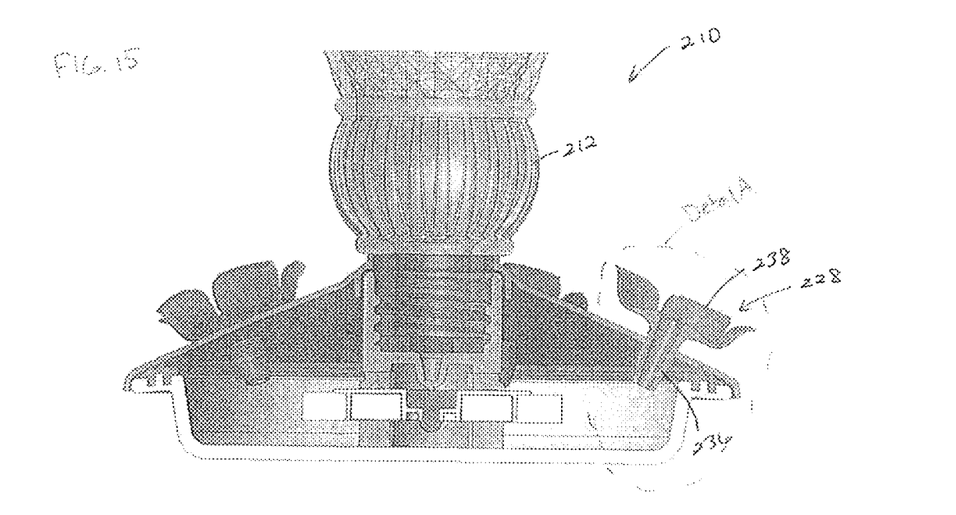
FIG. 15 is a side cut-away view of a feed port like that shown in FIG. 14 as mounted to the feeding basin.
Figure 15A:
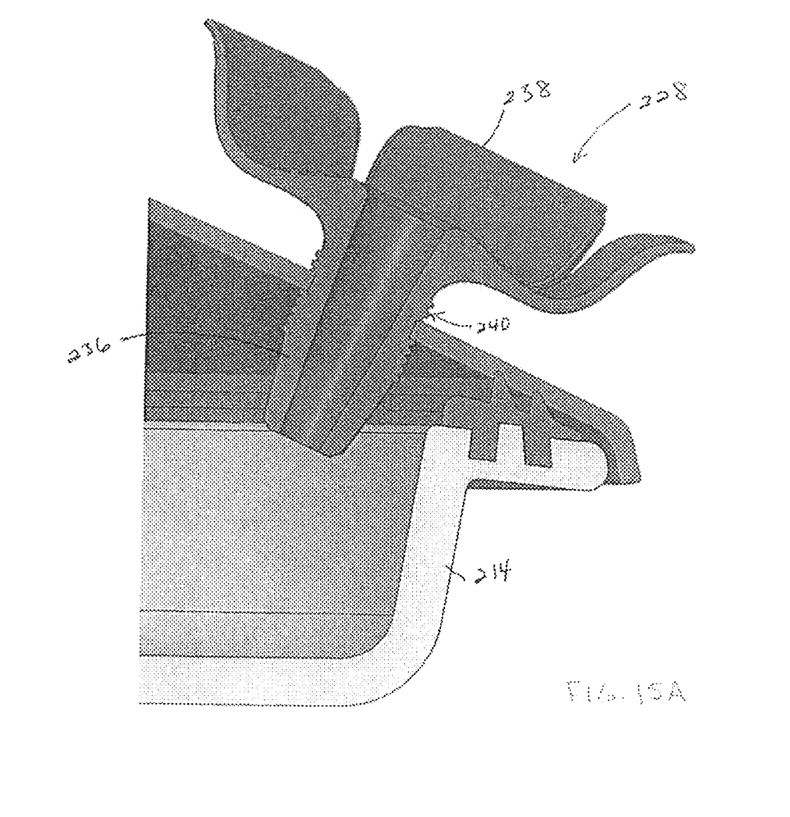
FIG. 15A is an enlarged view of Detail A of FIG. 15.

While plugs having two ribs are shown in the first two embodiments, FIGS. 1-7 and FIGS. 8-13A, the numbers of ribs could be greater than two and may have different spacing. For example, as an alternative to having two spaced ribs as has been described, a third embodiment is provided that includes a feed port, generally designated by reference numeral 228, having a plug 236 that is provided with a plurality of ribs 240 in abutment with one another as shown in FIGS. 14-15A. The reference numerals in the third embodiment that correspond in function with those already described in connection with the first and second embodiments are designated in FIGS. 14-15A with corresponding reference numerals to which the prefix of a "2" has been added. Therefore, the hummingbird feeder according to the third embodiment is designated by reference numeral 210, the feed port is designated by reference numeral 228, and so forth. With this understanding, only the aspects of the third embodiment that differ from the previous embodiments will be described in detail.

As shown in FIG. 14, the plurality of ribs 240 preferably includes about nine ribs, with "about" intended to refer to the stated value plus or minus four ribs. The plurality of abutting ribs 240 enable the plug to be press-fit into the feed port hole and held, by frictional interference with the rib intervals, at a number of different insertion depths.

Like the plug with two spaced ribs, the plug 238 having a plurality of abutting ribs 240 effectively secures the feed port and any additional feed port accessories in place relative to the basin cover. However, the plug 238 with ribs 240 can be pressed into the feed port hole at more than one intermediate position such that there may be more than one rib considered proximal to the head and positioned above the upper surface of the basin when the feed port is mounted for use. Hence, a feed port accessory mounted to the plug 238 can be secured with a functioning fit between a most proximal rib and the head or between any adjacent pair of ribs located above the basin, with the number of such ribs being variable according to the depth at which a user presses the feed port into the port hole. For example, with a plug having nine ribs as shown in FIG. 14, and numbering the ribs "one" through "nine", with "one" being the most proximal to the head, the mounting ring of the accessory may be positioned in between ribs "one" and "two", or between ribs "two" and "three", and so on, depending upon how deeply the feed port has been inserted into the feed port hole in the basin.

Therefore, as described herein, the present invention provides an elastomeric feed port having an enlarged head and a plug provided with a plurality of ribs, at least one of which serves as an accessory mounting rib. The feed port thus enables birds to access nectar held in a basin within which the feed port is mounted and also provides for the optional mounting of a perch or other feed port accessory adjacent the point of nectar access.

The foregoing descriptions and drawings should be considered as illustrative only of the principles of the invention. The invention may be configured in a variety of shapes and sizes and is not limited by the design features of the embodiments shown. Therefore, it is not desired to limit the invention to the specific examples disclosed or the exact construction and operation shown and described. Rather, all suitable modifications and equivalents may be resorted to, falling within the scope of the invention.

What is claimed is:

1. A hummingbird feeder comprising:
a nectar container having a lower end with a bottom opening;
a feeding basin removably coupled to the lower end of the nectar container and in liquid flow communication with said bottom opening, said feeding basin having a basin cover with at least one feed port opening therein; and
an elastomeric feed port fitted within the opening in the feeding basin, said feed port having an elongated passageway through which hummingbirds access nectar in the feeding basin, the feed port including an ornamentally-shaped head larger than the feed port opening and a plug with an outer surface having at least two annular ribs to secure the feed port within the opening in the feeding basin in at least two different positions.

2. The hummingbird feeder as set forth in claim 1, further comprising a feed port accessory mounted on the plug and secured to the feeding basin with the plug in an intermediate position in which a lower rib is inside the basin and an upper rib is adjacent an upper surface of the basin, the upper rib being proximal to the ornamentally-shaped head and the lower rib being distal from the ornamentally-shaped head, the elastomeric feed port and the feed port accessory forming a feed port assembly.

3. The hummingbird feeder as set forth in claim 2, wherein the feed port accessory has a mounting end with a ring that fits over the plug, the ring being positioned between the upper rib and the ornamentally-shaped head when the feed port assembly is mounted on the feeding basin.

4. The hummingbird feeder as set forth in claim 2, wherein the feed port accessory has a support arm with a mounting end having a ring that fits over the plug, the ring being positioned between the upper rib and the upper surface of the feeding basin when the feed port assembly is mounted on the feeding basin.

5. The hummingbird feeder as set forth in claim 4, wherein the support arm includes a downwardly depending tab having a hooked end that is secured over a lower edge of the basin cover to prevent the feed port accessory from rotating.

6. The hummingbird feeder as set forth in claim 5, wherein the feed port accessory includes a perch.

7. The hummingbird feeder as set forth in claim 6, wherein the ornamentally-shaped head is shaped like a flower.

8. The hummingbird feeder as set forth in claim 6, wherein the ornamentally-shaped head and the plug with the upper and lower ribs are integrally molded as a single piece.

9. A hummingbird feeder comprising:
a nectar container having a lower end with a bottom opening;
a feeding basin removably coupled to the lower end of the nectar container and in liquid flow communication with said bottom opening, said feeding basin having a cover with at least one feed port opening therein; and
a feed port assembly including an elastomeric feed port and a feed port accessory, the feed port having an ornamentally-shaped head integrally formed with a plug, the plug having an outer surface with at least two longitudinally spaced ribs and being configured to be received within the at least one feed port opening to secure the assembly to the feeding basin in at least two positions including an intermediate position in which the feed port accessory is mounted on the plug between an outer surface of the feeding basin and the head.

10. The hummingbird feeder as set forth in claim 9, wherein the ribs include an upper rib proximal to the ornamentally-shaped head and a lower rib distal from said ornamentally-shaped head, the upper rib being outside the feeding basin and the lower rib being inside the feeding basin when the feed port assembly is mounted in the intermediate position.

11. The hummingbird feeder as set forth in claim 10, wherein the feed port accessory has a mounting end with a ring that fits over the plug, the ring being positioned between the upper rib and the ornamentally-shaped head when the feed port assembly is mounted on the feeding basin.

12. The hummingbird feeder as set forth in claim 10, wherein the feed port accessory includes a support arm having a mounting end with a ring that fits over the plug, the ring being positioned between the upper rib and the upper surface of the feeding basin cover when the feed port assembly is mounted on the feeding basin.

13. The hummingbird feeder as set forth in claim 12, wherein the feed port accessory includes a perch.

14. The hummingbird feeder as set forth in claim 13, wherein the support arm includes a downwardly depending tab having a hooked end that is secured over a lower edge of the feeding basin cover to prevent the perch from rotating.

15. The hummingbird feeder as set forth in claim 9, wherein the elastomeric feed port can be mounted separately from the feed port accessory in a fully inserted position with both ribs inside the feeding basin.

16. The hummingbird feeder as set forth in claim 9, wherein the ornamentally-shaped head is shaped like a flower and has a diameter larger than the feed port opening.

17. The hummingbird feeder as set forth in claim 9, wherein the ribs include a plurality of ribs in abutment with one another and extending along the plug, the plurality of ribs enabling the feed port assembly to be secured within the feed port opening at variable depths that define a plurality of intermediate positions.

18. The hummingbird feeder as set forth in claim 17, wherein the plurality of ribs in abutment with one another includes between six and nine ribs.

* * * * *

(12) EX PARTE REEXAMINATION CERTIFICATE (12683rd)
United States Patent
Haney et al.

(10) Number: US 11,033,007 C1
(45) Certificate Issued: Aug. 22, 2024

(54) HUMMINGBIRD FEEDER WITH ELASTOMERIC ORNAMENTAL FEED PORT HAVING AN ACCESSORY MOUNTING RIB

(71) Applicant: WOODSTREAM CORPORATION, Lititz, PA (US)

(72) Inventors: Luke Benjamin Haney, Lititz, PA (US); Andrew Gauker, Mohnton, PA (US); Marko Lubic, Shillington, PA (US); Steven Charles Lorraine, Glastonbury, CT (US)

(73) Assignee: WOODSTREAM CORPORATION, Lititz, PA (US)

Reexamination Request:
No. 90/015,296, Sep. 8, 2023

Reexamination Certificate for:
Patent No.: 11,033,007
Issued: Jun. 15, 2021
Appl. No.: 16/380,546
Filed: Apr. 10, 2019

(51) Int. Cl.
*A01K 39/02* (2006.01)
(52) U.S. Cl.
CPC ............... *A01K 39/0206* (2013.01)

(58) Field of Classification Search
None
See application file for complete search history.

(56) References Cited

To view the complete listing of prior art documents cited during the proceeding for Reexamination Control Number 90/015,296, please refer to the USPTO's Patent Electronic System.

*Primary Examiner* — Patricia L Engle (57) ABSTRACT

A hummingbird feeder is provided that includes a nectar container removably coupled to a feeding basin having at least one feed port opening therein and a feed port assembly fitted within the feed port opening. The feed port assembly includes an elastomeric feed port and a feed port accessory. The elastomeric feed port is preferably one molded piece including an ornamentally-shaped head having a diameter greater than the feed port opening and a plug sized to fit snugly within the opening. The outer surface of the plug has at least two ribs longitudinally spaced from one another to enable the feed port to be secured to the basin in at least two different positions including an intermediate position in which the feed port accessory is mounted on the plug and secured between the head and the upper surface of the basin adjacent the feed port opening.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-18 were not reexamined.

1. A hummingbird feeder comprising:

a nectar container having a lower end with a bottom opening;

a feeding basin removably coupled to the lower end of the nectar container and in liquid flow communication with said bottom opening, said feeding basin having a basin cover with at least one feed port opening therein; and an elastomeric feed port fitted within the opening in the feeding basin, said feed port having an elongated passageway through which hummingbirds access nectar in the feeding basin, the feed port including an ornamentally-shaped head larger than the feed port opening and a plug with an outer surface having at least two annular ribs to *directly engage with an edge of the feed port opening and thereby* secure the feed port within the opening in the feeding basin in at least two different positions *within the feed port opening*.

\* \* \* \* \*